US012051240B2

(12) United States Patent
Geach et al.

(10) Patent No.: US 12,051,240 B2
(45) Date of Patent: Jul. 30, 2024

(54) PREDICTING VISIBLE/INFRARED BAND IMAGES USING RADAR REFLECTANCE/BACKSCATTER IMAGES OF A TERRESTRIAL REGION

(71) Applicant: UNIVERSITY OF HERTFORDSHIRE HIGHER EDUCATION CORPORATION, Hertfordshire (GB)

(72) Inventors: James Edward Geach, Hertfordshire (GB); Michael James Smith, Hertfordshire (GB)

(73) Assignee: UNIVERSITY OF HERTFORDSHIRE HIGHER EDUCATION CORPORATION, Hertfordshire (GB)

( * ) Notice: Subject to any disclaimer, the term of this patent is extended or adjusted under 35 U.S.C. 154(b) by 336 days.

(21) Appl. No.: 17/671,233

(22) Filed: Feb. 14, 2022

(65) Prior Publication Data
US 2022/0335715 A1    Oct. 20, 2022

Related U.S. Application Data

(63) Continuation of application No. PCT/GB2020/051787, filed on Jul. 24, 2020.

(30) Foreign Application Priority Data

Aug. 13, 2019 (GB) .................................. 1911577.3
Apr. 20, 2020 (GB) .................................. 2005720.4

(51) Int. Cl.
G06V 20/13      (2022.01)
G01S 7/41       (2006.01)
(Continued)

(52) U.S. Cl.
CPC .............. *G06V 20/13* (2022.01); *G01S 7/417* (2013.01); *G01S 13/9004* (2019.05); *G06T 7/11* (2017.01);
(Continued)

(58) Field of Classification Search
CPC ..... G06V 20/13; G01S 13/9004; G01S 7/417; G01S 13/9021; G01S 13/867; G06T 5/60;
(Continued)

(56) References Cited

U.S. PATENT DOCUMENTS 11,775,814 B1 * 10/2023 Anand .................. G06V 30/18
                                                        706/25
2008/0214945 A1 * 9/2008 Koertge ................. A61B 5/361
                                                        600/515
(Continued)

FOREIGN PATENT DOCUMENTS

CN      109636742 A     4/2019
GB      2586245 B       9/2021
(Continued)

OTHER PUBLICATIONS

Foreign Communication from a Related Counterpart Application, International Search Report and Written Opinion dated Oct. 15, 202, International Application No. PCT/GB2020/051787 filed on Jul. 24, 2020.
(Continued)

*Primary Examiner* — Congvan Tran
(74) *Attorney, Agent, or Firm* — Conley Rose P.C.

(57) ABSTRACT

The present invention relates to a method and apparatus that can predict the visible-infrared band images of a region of the Earth's surface that would be observed by an Earth Observation (EO) satellite or other high-altitude imaging platform, using data from radar reflectance/backscatter of the same region. The method and apparatus can be used to
(Continued)

Flowchart describing the general solution algorithm.

predict images of the Earth's surface in the visible-infrared bands when the view between an imaging instrument and the ground is obscured by cloud or some other medium that is opaque to electromagnetic (EM) radiation in the visible-infrared spectral range, approximately spanning 400-2300 nanometres (nm), but transparent to EM radiation in the radio-/microwave part of the spectrum. Regular, uninterrupted monitoring of the Earth's surface is important for a wide range of applications, from agriculture to defence.

26 Claims, 4 Drawing Sheets

(51) Int. Cl.
  *G01S 13/90* (2006.01)
  *G06T 7/11* (2017.01)
(52) U.S. Cl.
  CPC .............. *G06T 2207/10044* (2013.01); *G06T 2207/20081* (2013.01)
(58) Field of Classification Search
  CPC ..... G06T 5/92; G06T 7/11; G06T 5/77; G06T 2207/20084; G06T 2207/30192; G06T 2207/20081; G06T 2207/10044; G06N 3/045; G06N 3/084; G06N 3/047; G01C 11/02
  See application file for complete search history.

(56) References Cited

U.S. PATENT DOCUMENTS

| | | | | |
|---|---|---|---|---|
| 2015/0378014 | A1* | 12/2015 | Koudelka | G01S 7/411 342/25 A |
| 2017/0372505 | A1* | 12/2017 | Bhat | G06T 7/73 |
| 2019/0180432 | A1* | 6/2019 | Xin | G06V 10/56 |
| 2019/0252073 | A1* | 8/2019 | Hsu | G06N 3/047 |
| 2020/0327675 | A1* | 10/2020 | Lin | G06T 5/77 |
| 2020/0380312 | A1* | 12/2020 | Khan | G06F 18/2185 |
| 2021/0063565 | A1* | 3/2021 | Sharma | G01S 13/9027 |
| 2021/0150812 | A1* | 5/2021 | Su | G06F 18/285 |

FOREIGN PATENT DOCUMENTS

| | | |
|---|---|---|
| GB | 2595122 A | 11/2021 |
| WO | 2021028650 A1 | 2/2021 |

OTHER PUBLICATIONS

Grohnfeldi, et al., "A conditional Generative Adversarial Network to Fuse SAR and Mutlispectral Optical Data for Cloud Removal from Sentinel-2 Images" IGARSS 2018-2018 IEEE International Geoscience and Remote Sensing Symposium, IEEE, Jul. 22, 2018.

Gintautas, "how to fuse optical and radar imagery?" Geoscience and Remote Sensing Symposium (IGARSS), 2012 IEEE International, IEEE, Jul. 22, 2012.

Kondabathula, et al., "How to use metadata along with an image in CNN" https://forums.fast.ai/t/how-to-use-metadata-along-with-an-image-incnn-29361, Nov. 5, 2018.

Foreign Communication from a Related Counterpart Application, Great Britain Search Report dated Aug. 23, 2021, Great Britain Application No. GB2111302.2 filed on Aug. 13, 2018.

Enomoto, Kenji, et al., "Image translation between SAR and optical imagery with generative adversarial nets." IGARSS 2018-2018 IEEE International Geoscience and Remote Sensing Symposium. IEEE, 2018.

Wang, et al., "Generating high quality visible images from SAR images using CNNs.," 2018 IEEE radar Conference (RadarConf18). IEEE, 2018.

Isola, et al., "Image-to-Image Translation with Conditional Adversarial Networks", Berkeley AI research (BAIR) Laboratory, arXiv:1611.07004v3 [cs.CV], Nov. 26, 2018.

* cited by examiner

Figure 1: Flowchart describing the general solution algorithm.

Figure 2: (top) preferred generator, (middle) preferred injection, and (bottom) preferred discriminator subroutines.

Figure 3: (top) preferred downsampling residual block, (bottom) preferred upsampling residual block.

PREDICTING VISIBLE/INFRARED BAND IMAGES USING RADAR REFLECTANCE/BACKSCATTER IMAGES OF A TERRESTRIAL REGION

CROSS-REFERENCE TO RELATED APPLICATIONS

The present application claims priority to International Application No. PCT/GB2020/051787, filed Jul. 24, 2020, entitled "PREDICTING VISIBLE/INFRARED BAND IMAGES USING RADAR REFLECTANCE/BACKSCATTER IMAGES OF A TERRESTRIAL REGION," which claims priority to Great Britain Application No. GB 1911577.3 filed with the Intellectual Property Office of Great Britain on Aug. 13, 2019 and also Great Britain Application No. GB 2005720.4 filed with the Intellectual Property Office of Great Britain on Apr. 20, 2020, each of which are incorporated herein by reference in their entirety for all purposes.

FIELD OF THE INVENTION

The present invention relates to a method and apparatus that can predict the visible-infrared band images of a region of the Earth's surface that would be observed by an Earth Observation (EO) satellite or other high-altitude imaging platform, using data from radar reflectance/backscatter of the same region. The method and apparatus can be used to predict images of the Earth's surface in the visible-infrared bands when the view between an imaging instrument (e.g. a camera) and the ground is obscured by cloud or some other medium that is opaque to electromagnetic (EM) radiation in the visible-infrared spectral range, approximately spanning 400-2300 nanometres (nm), but transparent to EM radiation in the radio-/microwave part of the spectrum.

Regular, uninterrupted monitoring of the Earth's surface is important for a wide range of applications, from agriculture (e.g. assessing crop growth, identifying signatures of drought or estimating yields) to defence (e.g. identifying changes in land use related to military activity or conflict).

BACKGROUND OF THE INVENTION

EO satellites observe the surface of the Earth from orbit, delivering high-resolution images at different frequencies across the EM spectrum. The familiar combination of red, green, blue (RGB) bands yields an image akin to what the human eye sees, allowing one to visually distinguish (e.g.) lush pasture from a ploughed field. However, a rich variety of quantitative diagnostic information for remote sensing can be revealed from other combinations of observations across the visible-infrared spectral range. For example, the red (R) and near-infrared (NIR) bands can be combined to calculate the so-called normalized difference vegetation index (NDVI), which is an established indicator for assessing the presence and density of vegetation or detecting free-standing water.

Repeated "visits" by EO satellites observing the same region on a regular basis (e.g. daily, weekly, etc.) allow one to monitor and map temporal changes. An example could be the monitoring of the growth of a crop: one can use imaging from an EO satellite to determine the optimal time for harvest, estimate the expected yield, indicate where to irrigate or apply fertilizer, or identify anomalies related to crop stress that might require attention from land users.

A significant challenge in EO remote sensing is cloud cover, which can obscure the Earth's surface for imaging across the key visible and infrared wavebands. This is a serious issue for applications where regular and/or uninterrupted imaging is essential, such as monitoring during the peak growth cycle of a crop, or the rapid identification and mapping of environmental hazards such as flooding, or obtaining accurate intelligence regarding changes in land use. When the surface is obscured by cloud, direct imaging in the visible-infrared bands from any platform at an altitude equal to or above the cloud layer cannot be used. One would like a prediction of the view in the visible-infrared bands in these cases.

EO satellites that operate in the radio and microwave bands (e.g. the C-band at 4-8 GHz) of the EM spectrum can image the Earth's surface using Synthetic Aperture Radar (SAR), detecting the backscatter of the EM waves. Radar observations are not affected by cloud cover because clouds are transparent to radio waves. SAR imaging offers a route to regular imaging of the Earth's surface uninterrupted by cloud cover. An example of an EO platform obtaining SAR imaging of the Earth's surface are the European Space Agency Sentinel-1 satellites, operating C-band SAR. The European Space Agency Sentinel-2 satellites obtain imaging of the Earth's surface in several bands across the visible and infrared bands, approximately covering the 400-2300 nm spectral range. Other EO platforms exist and will continue to be developed to deliver SAR and visible-infrared imaging.

Ideally one would like to accurately predict the visible-infrared spectral response of the Earth's surface from SAR imaging alone so that the full range of remote sensing analytics that have been established in the visible-infrared bands (e.g. the NDVI, etc.) can be applied, even in the presence of cloud cover. However, since the radar reflectance and visible-infrared spectral response of any given patch of the Earth's surface is determined by different physics (e.g. absorption of certain frequencies of EM radiation in the visible bands by chlorophyll in leafy plants, versus reflectance and scattering of radio waves by leaf and stem surfaces), accurately translating SAR images to the corresponding visible-infrared images is not trivial. It is also for this reason that it is difficult to interpret SAR images directly to derive meaningful information about surface properties. For example, distinguishing a patch of bare soil within a pasture is straight-forward in visible imagery because bare soil has a characteristic brown colour compared to the green grass. In SAR imagery the radio/microwave reflectance (i.e. detected backscatter) properties of the bare soil and surrounding grass might be very subtle, and not distinguishable by eye or even a basic statistical analysis. Therefore it is desirable to seek methodology that can aid in the interpretation of, and extract information from, SAR imagery.

Current approaches that seek to exploit SAR for remote sensing are often focused on agricultural applications and include

- Empirically calibrating radar backscatter (single or multi-frequency and single or multi-polarization, single-epoch or multi-epoch) to biophysical parameters, such as (e.g.) the Leaf Area Index or fresh biomass through (e.g.) regression analyses
- Radiative transfer modelling of radar backscatter for different ground conditions/structures (e.g. a field of wheat)

Machine learning techniques that seek to predict (e.g.) single biophysical parameters such as Leaf Area Index, from radar backscatter measurements The main drawback of these existing techniques is in their specificity (e.g. to a single biophysical parameter) and (especially in the case of radiative transfer modelling), their complexity.

Another technique being investigated is 'deep learning' to predict a visible-infrared image or images from SAR imaging.

Berkeley AI Research (BAIR) Laboratory have undertaken some work in relation to the use of a conditional Generative Adversarial Network (cGAN) for image to image translation with a paper authored by Phillip Isola, Jun-Yan Zhu, Tinghui Zhou and Alexei A. Efros "Image-to-Image Translation with Conditional Adversarial Nets" [https://phillipi.github.io/pix2pix/]. This paper investigates the use of a cGAN as a general-purpose solution to image-to-image translation problems. These networks not only learn the mapping from input image to output image, but also learn a loss function to train this mapping. This makes it possible to apply the same generic approach to problems that traditionally would require very different loss formulations. These loss functions would previously need to be hand coded. Manually defining a loss function that accurately describes the accuracy of an image reproduction is an open problem. The paper discusses that the Pix2Pix cGAN approach is effective at synthesizing photos from label maps, reconstructing objects from edge maps, and colourizing images, among other tasks.

The paper sets out that GANs are generative models that learn a mapping from random noise vector z to output image y, G: z→y. In contrast, cGANs learn a mapping from observed image x and random noise vector z, to y, G: {x, z}→y. In Isola et al. (2016) noise is included via dropout [Srivastava et al. 2014]. The generator G is trained to produce outputs that cannot be distinguished from "real" images by an adversarially trained discriminator, D, which is trained to do as well as possible at detecting the generator's "fakes".

The objective of a cGAN can be expressed as $$L_{cGAN}(G,D)=E_{x,y}[\log D(x,y)]+E_{x,z}[\log(1-D(x,G(x,z)))]$$

where G tries to minimize this objective against an adversarial D that tries to maximize it, i.e. $G^*=\arg \min_G \max_D L_{cGAN}(G, D)$.

To test the importance of conditioning the discriminator, in the paper they also compare to an unconditional variant in which the discriminator does not observe x:

$$L_{GAN}(G,D)=E_y[\log D(y)]+E_{x,z}[\log(1-D(G(x,z)))]$$

Previous approaches have found it beneficial to mix the GAN objective with a more traditional loss, such as L2 distance. This incentivizes G to produce images that not only "fool" D, but that are also close quantitatively to the ground truth.

$$L_{L1}(G)=E_{x,y,z}[|y-G(x,z)|]$$

And as Such their Final Objective is $$G^*=\arg \min_G \max_D L_{cGAN}(G,D)+\lambda L_{L1}(G)$$

An application created that uses this method is called Pix2Pix, and is the basis for much work in this area in relation to translation of images of one type to another type such as from a satellite image to a Google® map image.

"A Conditional Generative Adversarial Network to Fuse SAR And Multispectral Optical Data For Cloud Removal From Sentinel-2 Images" [https://www.researchgate.net/publication/325295725_A_Conditional_Generative_Adversarial_Network_to_Fuse_Sar_And_Multispectral_Optical_Data_For_Cloud_Removal_From_Sentinel-2_Images] uses a cGAN architecture. An input SAR image is combined with a "corrupted" Multispectral (MS) image (with semi-transparent cloud cover). Therefore, this method does not work on imagery with complete cloud cover impermeable to visible light. This method is typically used for de-hazing of MS images with some but not complete cloud cover and requires a combination of SAR and MS images in order to generate an output. However, the method is able to retrieve the full spectrum of Sentinel-2 imagery.

"The SEN1-2 Dataset For Deep Learning In SAR-Optical Data Fusion" [https://arxiv.org/pdf/1807.01569.pdf] presents a GAN-based technique for colourizing and producing artificial optical imagery from SAR data. This method uses SAR—Google® Earth image pairs to train a Pix2Pix GAN. However, as the image pairs that they employ are not temporally correlated Google® Earth/SAR image pairs, this results in anomalously coloured fields. Furthermore, this method is restricted to predicting RGB imagery.

"Generating High Quality Visible Images from SAR Images Using CNNs" [https://arxiv.org/pdf/1802.10036.pdf] uses a GAN cascade to firstly remove "speckling" from SAR imagery, and then to colourize the resultant cleaned SAR imagery. Again, since the image pairs that they employ are not temporally correlated SAR-Google® Earth image pairs, this results in anomalously coloured fields. Also this method only predicts RGB bands, not all bands of Sentinel-2 data, which also cover the Red Edge, Near IR (NIR) and Short Wave IR (SWIR).

"Exploiting GAN-based SAR To Optical Image Transcoding For Improved Deep Learning Classification" [https://ieeexplore.ieee.org/document/8438032] uses temporally correlated SAR/RGB-NIR image pairs to train a conditional GAN. First the SAR imagery is colourized, and then the resulting data is passed through to a semantic segmentor Convolutional Neural Network (CNN). The final result is a semantically segmented image. The authors note problems with realistic colour retrieval. There are also issues with fine-detail retrieval. Again this method does not retrieve the full spectrum, only RGB-NIR.

SUMMARY OF THE INVENTION

According to a first aspect of the present invention there is provided a method of creating a mapping model for translating an input image to an output image, the method comprising obtaining an ensemble of training data T comprising a sample of pairs of matched images [R,V], providing a neural network and training the neural network with the training data T to obtain the mapping model V*=f(R) that translates input image R to output image V* where V* is equivalent to V in a flawless mapping.

Preferably the training data T comprises a plurality of real matched images [R,V].

Preferably the neural network comprises a generator and a discriminator.

Preferably the training comprises:
1) propagating R into the generator, wherein the generator produces V* which represents a "fake" version of V based on a transformation of R
2) associating V* with R to form new matched pair [R,V*]
3) propagating [R,V*] into the discriminator to determine the probability that V* is "real", wherein the probability that V* is "real" is estimated from a loss function that encodes the quantitative distance between V and V*

4) backpropagating the error defined by the loss function through the neural network.

Preferably there are N iterations of training steps 1 to 4 wherein T is sampled at each iteration.

In one alternative the loss function is learnt by the neural network.

In another alternative the loss function is hard-coded.

In a further alternative the loss function may be a combination of hard-coding and learning by the neural network. Preferably the loss function is a combination of a learnt GAN loss, and the Least Absolute Deviations (L1) loss, with the L1 loss weighted at a fraction the GAN loss, in one alternative the L1 loss is weighted at 0.01× the GAN loss.

Preferably each image in R and V is normalised.

Preferably the normalisation comprises a rescaling of the input values to floating point values in a fixed range, in one alternative the normalisation comprises a rescaling of the input values to floating point values in the range of 0 to 1.

Preferably the neural network comprises an encoder-decoder neural network, more preferably the neural network comprises a conditional GAN, even more preferably the neural network comprises a fully convolutional conditional GAN.

The advantage of using a conditional GAN is that the neural network not only learns the mapping from input image to output image, but also learns the loss function to train this mapping. The advantage of using a fully convolutional conditional GAN is that in addition the input images R do not all need to be of the same size and can be of different sizes to each other.

Preferably the backpropagation of the error defined by the loss function updates the weights in the neural network so that they follow the steepest descent of the loss between V and V*.

Preferably R comprises at least one SAR image, encoded as a data matrix.

Preferably V comprises at least one image in the visible-infrared spectral range, encoded as a data matrix.

Preferably the visible-infrared spectral range is between about 400-2300 nanometres (nm).

Preferably R is of size m×n of a patch of the Earth's surface spanning a physical region p×q.

Preferably V is of size m×n of a patch of the Earth's surface spanning a physical region p×q.

Preferably V is of size m×n at one or more frequencies across the visible-infrared spectral range.

Preferably V* is of size m×n of a patch of the Earth's surface spanning a physical region p×q.

Preferably V* is of size m×n at one or more frequencies across the visible-infrared spectral range.

In one alternative where there are a plurality of images R they are all recorded at a single radar frequency In another alternative where there are a plurality of images R they are recorded at multiple frequencies. For example, L-band+C-band.

In one alternative where there are a plurality of images R they are all recorded at a single polarisation. For example, vertical-vertical.

In another alternative where there are a plurality of images R they are recorded at multiple polarisations. For example, vertical-vertical and vertical-horizontal.

In another alternative where there are a plurality of images R they are recorded at different detection orientations/incident angles. For example, they could be taken by different satellites on different orbits.

Preferably R further comprises additional information representing prior knowledge about the region of interest or the observing conditions of V and/or R.

Preferably the additional information includes but is not limited to a map of the surface elevation; a previously observed unobscured view in one or more visible-infrared spectral bands; a map of the location of each pixel; time of year; and sun elevation/azimuth angle information.

Preferably the additional information is selected from one or more of: a map of the surface elevation; a previously recorded unobscured view in one or more visible-infrared spectral bands; a map of the location of each pixel; time of year; and sun elevation/azimuth angle information.

According to a second aspect of the present invention there is provided an imaging apparatus for creating a mapping model for translating an input image to an output image as set out in the first aspect of the present invention.

According to a third aspect of the invention there is provided a method of translating an input image R to an output image V*, the method comprising obtaining a mapping model for translating an input image to an output image as set out in the first aspect of the present invention inputting a new image R into the mapping model wherein the mapping model translates input image R and outputs image V.

Preferably the input R comprises at least one SAR image, encoded as a data matrix.

Preferably the output V* comprises at least one image in the visible-infrared spectral range, encoded as a data matrix.

Preferably the visible-infrared spectral range is between about 400-2300 nanometres (nm).

Preferably the input image R is of size m×n.

Preferably the input image R is of size m×n of a patch of the Earth's surface spanning a physical region p×q.

Preferably the output image V* is of size m×n of a patch of the Earth's surface spanning a physical region p×q.

Preferably the output image V* is of size m×n at one or more frequencies across the visible-infrared spectral range.

In one alternative where there are a plurality of input images R they are all recorded at a single radar frequency.

In another alternative where there are a plurality of input images R they are recorded at multiple frequencies. For example, L-band+C-band.

In one alternative where there are a plurality of input images R they are all recorded at a single polarisation. For example, vertical-vertical.

In another alternative where there are a plurality of input images R they are recorded at multiple polarisations. For example, vertical-vertical and vertical-horizontal.

In another alternative where there are a plurality of input images R they are recorded at different detection orientations/incident angles. For example, they could be taken by different satellites on different orbits with different view angles.

Preferably R further comprises additional information representing prior knowledge about the region of interest or the observing conditions.

Preferably the additional information includes but is not limited to a map of the surface elevation; a previously observed unobscured view in one or more visible-infrared spectral bands; a map of the location of each pixel; time of year; and sun elevation/azimuth angle information.

Preferably the additional information is selected from one or more of: a map of the surface elevation; a previously observed unobscured view in one or more visible-infrared spectral bands; a map of the location of each pixel; time of year; and sun elevation/azimuth angle information.

According to a fourth aspect of the present invention there is provided a method of predicting the visible-infrared band images of a region of the Earth's surface that would be observed by an EO satellite or other high-altitude imaging platform, using data from SAR imaging of the same region.

Preferably the method is used to predict images of the Earth's surface in the visible-infrared bands when the view between an imaging instrument (e.g. a camera) and the ground is obscured by cloud or some other medium that is opaque to EM radiation in the visible-infrared spectral range, approximately spanning approximately 400-2300 nanometres (nm), but transparent to EM radiation in the radio-/microwave part of the spectrum.

Preferably the method used is set out in the third aspect of the present invention. According to a fifth aspect of the present invention there is provided a method of producing a predicted visible-infrared band image of a region of the Earth's surface that would be observed by an EO satellite or other high-altitude imaging platform, using data from SAR imaging of the same region.

Preferably the method is used to produce a predicted image of the Earth's surface in the visible-infrared bands when the view between an imaging instrument (e.g. a camera) and the ground is obscured by cloud or some other medium that is opaque to EM radiation in the visible-infrared spectral range, approximately spanning approximately 400-2300 nanometres (nm), but transparent to EM radiation in the radio-/microwave part of the spectrum.

Preferably the method used is set out in the third aspect of the present invention.

According to a sixth aspect of the present invention there is provided an imaging apparatus for translating an input image R to an output image V* as set out in the third aspect of the present invention.

According to a seventh aspect of the present invention there is provided an imaging apparatus for translating an input image R to an output image V* as set out in the fourth aspect of the present invention.

According to an eighth aspect of the present invention there is provided a method of generating a new set of images V+ at any frequency in the range approximately spanning 400-2300 nm from V*.

Preferably the method comprises the following steps:
a) considering a pixel at coordinate (x,y) in each image in V*, wherein V* can be considered a set of images V*=[V0, V1, V2, . . . VN] wherein each image corresponds to an observed bandpass at some average wavelength of EM radiation and wherein the set of wavelengths associated with each image is lambda= [lambda0, lambda1, lambda2 . . . lambdaN];
b) assuming a function S(x,y,lambda,p) represents the continuous spectral response of the Earth surface, where p are a set of parameters. S is described by Equation 1 and p represents 6 free parameters;
c) finding p for each pixel (x,y) by fitting the function S(x,y,lambda,p) to (lambda,V*)
d) creating a new set of images V+ covering the same region as V* by applying S(x,y,lambda,p) for any given wavelength lambda $$S(\lambda)=[p_0(1+\exp(-p_1(\lambda-p_2)))^{-1}+p_3]\times\exp(-p_4(\lambda/1500\ nm))+p_5\exp(-(\lambda-c)^2/2\ g^2)$$ Equation 1

Preferably the emission can be calculated at a particular value of lambda to predict the emission at particular wavelength of EM radiation.

Alternatively, convolve the continuous spectrum S with arbitrary bandpass response r(lambda) which will have an effective or average wavelength.

In one alternative the Gaussian width g and centre c are variable, in another alternative g=20 nm and c=560 nm.

In one alternative step c) is carried out using least squares minimization.

The V+ images can be stored in any format convenient for onward analysis (e.g. GeoTIFF), including any relevant georeferencing metadata.

The algorithm can reliably predict images of the Earth's surface at any wavelength across the visible to infrared spectral range (wavelengths spanning approximately 400-2300 nm) using SAR imaging.

According to a ninth aspect of the present invention there is provided a method of deriving meaningful indicators of surface conditions by producing a predicted visible-infrared band image of a region of the Earth's surface that would be observed by an EO satellite or other high-altitude imaging platform, using data from SAR imaging of the same region comprising the steps of
a) creating a mapping model for translating an SAR image to a visible-infrared band image, the method comprising obtaining an ensemble of training data T comprising a sample of pairs of matched images [R,V], providing a neural network and training the neural network with the training data T to obtain the mapping model V*=f(R) that translates SAR image R to visible-infrared band image V* where V* is equivalent to V in a flawless mapping; and
b) inputting a new SAR image R into the mapping model wherein the mapping model translates the new SAR image R to produce visible-infrared band image V*.

Preferably R further comprises additional information representing prior knowledge about the region of interest or the observing conditions of V and/or R.

Preferably the additional information includes but is not limited to a map of the surface elevation; a previously observed unobscured view in one or more visible-infrared spectral bands; a map of the location of each pixel; time of year; and sun elevation/azimuth angle information.

Preferably the additional information is selected from one or more of: a map of the surface elevation; a previously recorded unobscured view in one or more visible-infrared spectral bands; a map of the location of each pixel; time of year; and sun elevation/azimuth angle information.

According to a tenth aspect of the present invention there is provided a system for deriving meaningful indicators of surface conditions by producing a predicted visible-infrared band image of a region of the Earth's surface that would be observed by an EO satellite or other high-altitude imaging platform, using data from SAR imaging of the same region comprising:
a) a mapping model for translating an SAR image to a visible-infrared band image, the method comprising obtaining an ensemble of training data T comprising a sample of pairs of matched images [R,V], providing a neural network and training the neural network with the training data T to obtain the mapping model V*=f(R) that translates SAR image R to visible-infrared band image V* where V* is equivalent to V in a flawless mapping stored on a non-transitory tangible computer readable storage medium; and
b) inputting a new SAR image R into the mapping model wherein the mapping model translates the new SAR image R to produce visible-infrared band image V*.

Preferably R further comprises additional information representing prior knowledge about the region of interest or the observing conditions of V and/or R.

Preferably the additional information includes but is not limited to a map of the surface elevation; a previously observed unobscured view in one or more visible-infrared spectral bands; a map of the location of each pixel; time of year; and sun elevation/azimuth angle information.

Preferably the additional information is selected from one or more of: a map of the surface elevation; a previously recorded unobscured view in one or more visible-infrared spectral bands; a map of the location of each pixel; time of year; and sun elevation/azimuth angle information.

According to an eleventh aspect of the present invention there is provided a non-transitory tangible computer readable storage medium having stored thereon a computer program for implementing a method of producing a predicted visible-infrared band image of a region of the Earth's surface that would be observed by an EO satellite or other high-altitude imaging platform, using data from SAR imaging of the same region comprising the steps of
   a) creating a mapping model for translating an SAR image to a visible-infrared band image, the method comprising obtaining an ensemble of training data T comprising a sample of pairs of matched images [R,V], providing a neural network and training the neural network with the training data T to obtain the mapping model V*=f(R) that translates SAR image R to visible-infrared band image V* where V* is equivalent to V in a flawless mapping; and
   b) inputting a new SAR image R into the mapping model wherein the mapping model translates the new SAR image R to produce visible-infrared band image V*.

Preferably R further comprises additional information representing prior knowledge about the region of interest or the observing conditions of V and/or R.

Preferably the additional information includes but is not limited to a map of the surface elevation; a previously observed unobscured view in one or more visible-infrared spectral bands; a map of the location of each pixel; time of year; and sun elevation/azimuth angle information.

Preferably the additional information is selected from one or more of: a map of the surface elevation; a previously recorded unobscured view in one or more visible-infrared spectral bands; a map of the location of each pixel; time of year; and sun elevation/azimuth angle information.

According to a twelfth aspect of the present invention there is provided a non-transitory tangible computer readable storage medium having stored thereon a computer program for implementing a method of deriving meaningful indicators of surface conditions by producing a predicted visible-infrared band image of a region of the Earth's surface that would be observed by an EO satellite or other high-altitude imaging platform, using data from SAR imaging of the same region comprising the steps of
   a) creating a mapping model for translating an SAR image to a visible-infrared band image, the method comprising obtaining an ensemble of training data T comprising a sample of pairs of matched images [R,V], providing a neural network and training the neural network with the training data T to obtain the mapping model V*=f(R) that translates SAR image R to visible-infrared band image V* where V* is equivalent to V in a flawless mapping; and
   b) inputting a new SAR image R into the mapping model wherein the mapping model translates the new SAR image R to produce visible-infrared band image V*.

Preferably R further comprises additional information representing prior knowledge about the region of interest or the observing conditions of V and/or R.

Preferably the additional information includes but is not limited to a map of the surface elevation; a previously observed unobscured view in one or more visible-infrared spectral bands; a map of the location of each pixel; time of year; and sun elevation/azimuth angle information.

Preferably the additional information is selected from one or more of: a map of the surface elevation; a previously recorded unobscured view in one or more visible-infrared spectral bands; a map of the location of each pixel; time of year; and sun elevation/azimuth angle information.

This Invention presents a general method to produce predicted visible-infrared images observed by a given EO satellite (or other reconnaissance platform that might be affected by intervening obscuration) using SAR imaging alone. This allows for a wide range of remote sensing predictions to be made using the full visible-infrared spectral range even in the presence of cloud cover or some other obscuring medium, provided the medium is transparent to EM radiation in the radio-/microwave part of the spectrum.

Rather than 'colourizing' a SAR image (i.e. assigning spectral information to pixels in a monochromatic image), the presented method produces images by fully predicting the visible-infrared spectral response pixel-by-pixel, thus is not biased to the resolution of the input SAR imagery or its ability to capture fine surface detail.

Advantageously this method can produce predicted visible-infrared spectral response images using SAR imagery alone, offering predictive power where obscuration is 100%. Other approaches combine SAR and visible imaging to 'dehaze' images, e.g. when cloud cover is not 100% opaque to visible and infrared photons.

Advantageously this method takes as input either one SAR input for a given target region (e.g. an image at a single frequency, polarization and orientation) or multiple inputs (e.g. multiple images at various frequencies, polarizations and orientations).

Advantageously this method can incorporate additional 'prior' information about a particular geographic region (for example, surface elevation mapping, sun angle information at the time of observation, and/or previous unobscured views). This improves the predictive power of the algorithm.

Advantageously this method can retrieve all spectral information present in the training set, spanning a wide range of frequencies from the visible to infrared. It is also possible to generate 'synthetic' images at any intermediate frequency not necessarily represented by the training set. This makes it possible to generate/predict output images that would be observed by a different instrument/filter.

BRIEF DESCRIPTION OF THE DRAWINGS

Other aspects and features of the present invention will become apparent to those ordinarily skilled in the art upon review of the following description of specific embodiments of the invention in conjunction with the accompanying figures.

DETAILED DESCRIPTION OF PREFERRED EMBODIMENTS

Figure 1:
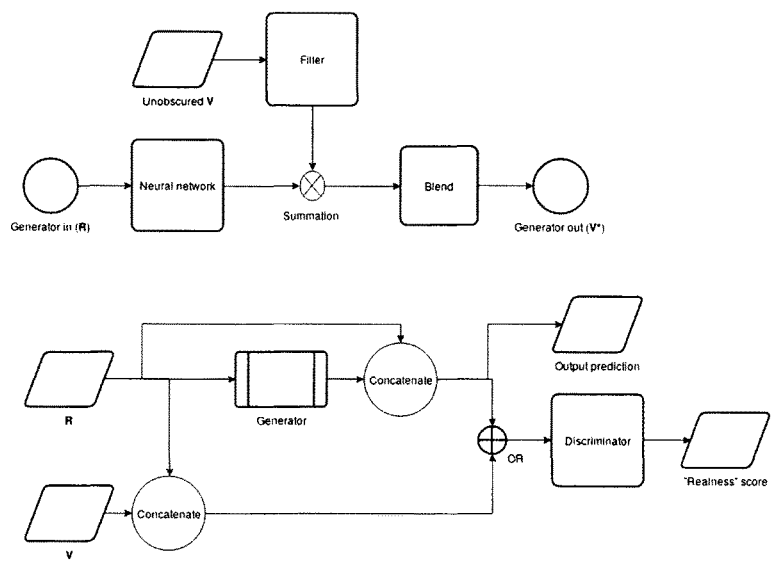
FIG. 1 illustrates a schematic view of the general solution algorithm of the present invention.

The invention is an algorithmic (neural network) pipeline that takes as input one or more SAR data matrices (images) each of size m×n of a patch of the Earth's surface spanning a physical region p×q. The algorithm predicts the corresponding image(s) of size m×n at one or more frequencies across the visible-infrared bands. The algorithm may be performed on a computer system. Computer systems are discussed in more detail hereinafter.

We call the ensemble of input images of a given region R. We call the ensemble of output images of a given region V*. The input image(s) R could be at a single radar frequency, or multiple frequencies (e.g. L-band+C-band), and at a single polarization (e.g. vertical-vertical) or multiple polarizations (e.g. vertical-vertical and vertical-horizontal). They could also be obtained at different detection orientations/incident angles (e.g. obtained by different satellites on different orbits). Optionally, R can be supplemented by additional information representing prior knowledge about the region of interest (e.g. a map of the surface elevation and/or sun angle information at the time of observation and/or a previously measured unobscured view in each band in V*).

Given a pair [R,V], where V represents the direct unobscured view of a particular region in the visible and infrared bands, it is assumed there exists a mapping V=f(R) that translates R to V. The algorithm determines f through a training process. After training, the algorithm can use f to translate new inputs R to outputs V*. These outputs V* represent the prediction of the unobscured view V across the visible and infrared bands given only the information in R, where V=V* represents a flawless mapping.

It is expected that the training and input data will be suitably calibrated/normalised, for example the SAR data will represent detected radio/microwave backscatter reflectance and the visible-infrared data will represent Top Of Atmosphere Reflectance or Bottom of Atmosphere Reflectance values. However, in principle the exact calibration of the data is arbitrary, provided it is consistent across training data and new inputs.

To find the mapping function f, the algorithm attempts to minimise the difference between V and f(R). Training involves:

1. Assembling pairs of image ensembles [R,V] where V contain images free from cloud cover or other obscuration. R and V could be sourced from different imaging platforms (e.g. different satellites) but are matched in terms of area coverage such that each [R,V] pair covers the same physical area p×q. They need not be at identical spatial resolution. Generally each pair in the training set will cover a different geographic region, but pairs could also overlap in coverage.
2. Incrementally adjusting the mapping function N times, reducing the difference between V and f(R) slightly with each increment. Each adjustment changes some weights in f, which moves the output f(R) closer to the ground truth V. This incremental adjustment continues such that the quantitative difference (for example, as defined by the pixel-wise sum of the absolute difference) between V and f(R) is minimized.

Optionally, to improve the quality of the predicted images, a filtered representation of the unobscured image in each of the visible-infrared bands represented by V can be injected during training. This image represents prior knowledge about the region of interest, for example the last-measured unobscured image of that region, or a median-averaged masked stack of all (or a sub-set of) images of a given region to date or within recent time. These optional injected images are spatially filtered to remove low spatial frequency information, leaving high spatial frequency information that encodes fine detail about the scene. One filtering approach is to apply an unsharp mask, whereby the image is convolved with a Gaussian kernel and the convolved (smoothed) image subtracted from the original. However, other filtering techniques are possible.

After training, the model describing the mapping V=f(R) is stored on disk or other computer readable medium as a data object, and fully describes the mapping function as a transformation matrix. The model can be loaded into memory and a new input R can then be presented to the function, which will apply f(R) to produce new outputs V.

If the training data samples a range of wavelengths over the visible-to-infrared spectral range (e.g. as is the case for multi-band Sentinel-2 imagery), it is possible to produce images at any arbitrary wavelength across the range approximately spanning 400-2300 nm using an interpolation function. This makes it possible to predict imagery that would be obtained by an arbitrary detector (e.g. another satellite platform) in the visible-infrared range.

General Solution

A schematic view of the general solution algorithm is shown in FIG. 1. The following describes the main steps.

Consider an ensemble of training data T comprising a set of 'real' [R,V] pairs. Each [R,V] pair represents imagery of particular geographic region. Preferably the data in R and V in a given pair would be observed at the same time, but realistically they will be observed at slightly different times. Ideally each [R,V] pair will be assembled such that the SAR images and visible-infrared images are taken close together in time as is feasible. Importantly, R can also include non-SAR information, such as a digital elevation model or measurement, sun elevation angle or time of year. Other information could also be included. Each image in V is an unobscured (e.g. zero cloud cover, low cirrus) image of the region. The calibration of each data component is in principle arbitrary, but should be consistent across the training data. For example, all input images in V representing the red band could be normalised to values of 0-10000. The same calibration should apply to all red images processed by the algorithm.

Training involves a series of N iterations whereby T is sampled at each iteration. The sampling can pick a single pair of [R,V] from T or a 'batch' of M pairs of [R,V] from T. At each iteration the algorithm proceeds as follows, processing either a single pair [R,V] or batch of pairs of [R,V]:

1. Each data matrix in R is normalised and passed to the 'generator'. The purpose of the generator is to produce a generated (or 'fake') set of data based on a transformation of R:
   a. R propagates through a neural network. This network consists of one or more 'layers' of artificial neurons. An artificial neuron is effectively a mathematical function that transforms an input to an output by multiplication by a weight and application of an 'activation function'. The layers of neurons act like a transformation matrix on the input, R. Each neuron layer initially comprises of a set of randomised weights, which multiply subsections of the incoming matrix R. This step produces an output V* which represents a 'fake' or generated version of V based on R.

b. Optionally, R can contain channels with additional known prior information. For example, a channel could contain a surface elevation map. An image with all pixels set to the same value could be used to encode information shared by the entire image, for example, the average sun elevation angle, or the number of days since January $1^{st}$ of that year at the time of observation.

c. Optionally, images representing an estimate of the unobscured surface (e.g. a cloud-free median stack from archival visible-infrared data) in each band represented by V are filtered and injected into the network. One purpose of the filtering could be to remove colour information and low spatial frequency information from the data. The filtered images F are summed with the corresponding image in V*.

d. Optionally, a final set of neuron layer(s) are applied to blend F and V* to produce the generator output.

2. The generator output(s) V* are concatenated with the corresponding input(s) R to form a new pair [R,V*]. This is the 'fake' or generated data. This data is passed to the 'discriminator'.

3. The discriminator estimates the probability that V* is an example from the real set of data T. The probability is estimated from a loss function that encodes the quantitative distance between V and V*. The loss function itself could be learnt by the neural network, or could be hard-coded, or could be a combination of the two. For example, a possible loss function could be the sum of the squared differences between pixels in V and V*, but other loss functions are feasible.

4. Backpropagation is used to update the network weights so that they follow the steepest descent of the loss (or prediction 'error') between V and V*. Backpropagation is the technique of updating the network weights back through layers of a neural network through gradient descent, where the gradient refers to the gradient of the loss function and is normally evaluated through auto-differentiation. By descending down the gradient, the algorithm seeks the minimum of the loss function. Due to the architecture of a neural network, the weights in successive layers can be updated following the chain rule. After updating, the performance of the discriminator in classifying a given image as being sampled from the real data T or is an output of the generator is improved.

5. The weights of the generator are updated to increase the probability that the generator output is misclassified by the discriminator as being from the real data T.

6. [R,V] is passed to the discriminator. The discriminator estimates the probability that [R,V] is sampled from the generated set of [R,V*] through the same loss function as (3). The loss, or prediction 'error' is backpropagated through the network, and the weights of the discriminator are updated to follow the steepest descent of the loss function.

7. The weights of the discriminator are updated to improve the probability (i.e. reduce the loss) that it correctly classifies [R,V] as being sampled from the real data T and [R,V*] as being a product of the generator.

8. The outputs of the generator can be retrieved at any point during or after training.

After training is complete the network can be stored on disk or other computer readable medium as a transformation matrix encoding all weight information. This is referred to as the 'model'. The model can now accept a new input R and generate an associated output V* through step 1. V* represents the prediction for the unseen (e.g. obscured) V that corresponds to R. The images comprising V* are de-normalised to produce images calibrated in an identical manner to the training set. The images can be stored in any format convenient for onward analysis (e.g. GeoTIFF), including any relevant georeferencing metadata.

Preferred Solution

Assuming training data T is assembled into an ensemble of [R,V] pairs as described above, where each R in a preferred example comprises:

1. A C-band (approx. 5.4 GHz) VH (vertical transmit-horizontal receive) cross-polarised SAR image observed on an ascending polar orbit, spanning a physical region 10.24×10.24 km with a pixel scale of 10 m/pix. Preferably the SAR data is projected to ground range using an Earth ellipsoid model. Preferably the SAR image is corrected for thermal noise. Preferably radiometric calibration is applied. Preferably orthorectification is applied.

2. A C-band (approx. 5.4 GHz) VH (vertical transmit-horizontal receive) cross-polarised SAR image observed on a descending polar orbit, spanning a physical region 10.24×10.24 km with a pixel scale of 10 m/pix. Preferably the SAR data is projected to ground range using an Earth ellipsoid model. Preferably the SAR image is corrected for thermal noise. Preferably radiometric calibration is applied. Preferably orthorectification is applied.

3. A C-band (approx. 5.4 GHz) VV (vertical transmit-vertical receive) like-polarised SAR image observed on an ascending polar orbit, spanning a physical region 10.24×10.24 km with a pixel scale of 10 m/pix. Preferably the SAR data is projected to ground range using an Earth ellipsoid model. Preferably the SAR image is corrected for thermal noise. Preferably radiometric calibration is applied. Preferably orthorectification is applied.

4. A C-band (approx. 5.4 GHz) VV (vertical transmit-vertical receive) like-polarised SAR image observed on a descending polar orbit, spanning a physical region 10.24×10.24 km with a pixel scale of 10 m/pix. Preferably the SAR data is projected to ground range using an Earth ellipsoid model. Preferably the SAR image is corrected for thermal noise. Preferably radiometric calibration is applied. Preferably orthorectification is applied.

5. An image encoding the surface elevation interpolated onto the same pixel grid as the SAR images 1-4.

6. An image with an identical pixel grid to images 1-5 with pixels set to a single value representing the average time of observations 1-4, defined as the number of days since January $1^{st}$ divided by 365.

The training set T is assembled in a preferred example as follows:

1. Identify a cloud-free and preferably low cirrus image spanning 10.24×10.24 km of the Earth's surface in one or more bands across the visible-infrared spectral range, e.g. (R, G, B, NIR) with a pixel scale of 10 m/pix. Preferably images in these bands will be recorded at the same time, t, for a given region.

Preferably each band will represent Bottom Of Atmosphere reflectance values. These images constitute a single V.
2. For the V defined in 1 construct the corresponding R as above, where each SAR image 1-4 represents the median of all corresponding SAR images for the same physical region covered by V recorded within plus or minus 3 days of t
3. Repeat 1 & 2 to assemble a large number (preferably 1000s) of [R,V] pairs to form T. Preferably these will include different geographic regions, and for a given region, multiple observations recorded at different times of year.

Figure 2:
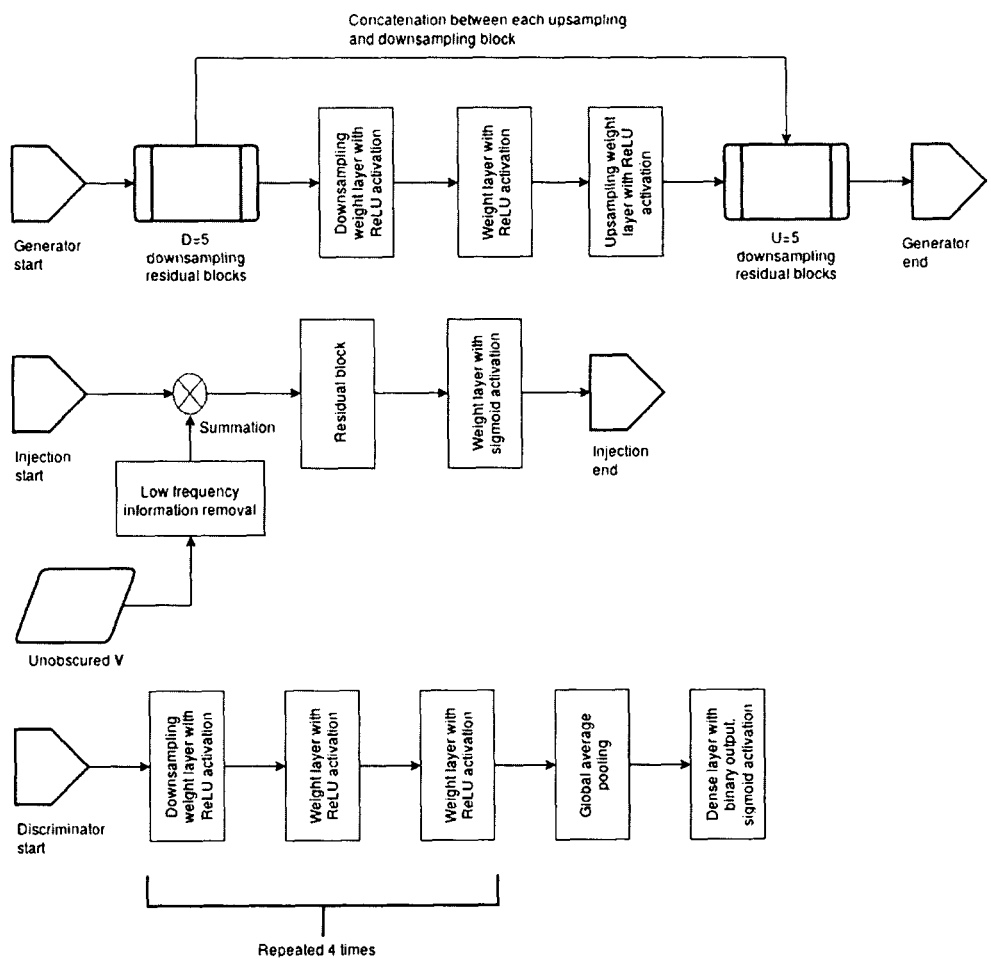
FIG. 2 illustrates a (top) preferred generator, (middle) preferred injection, and (bottom) preferred discriminator subroutines.
Figure 3:
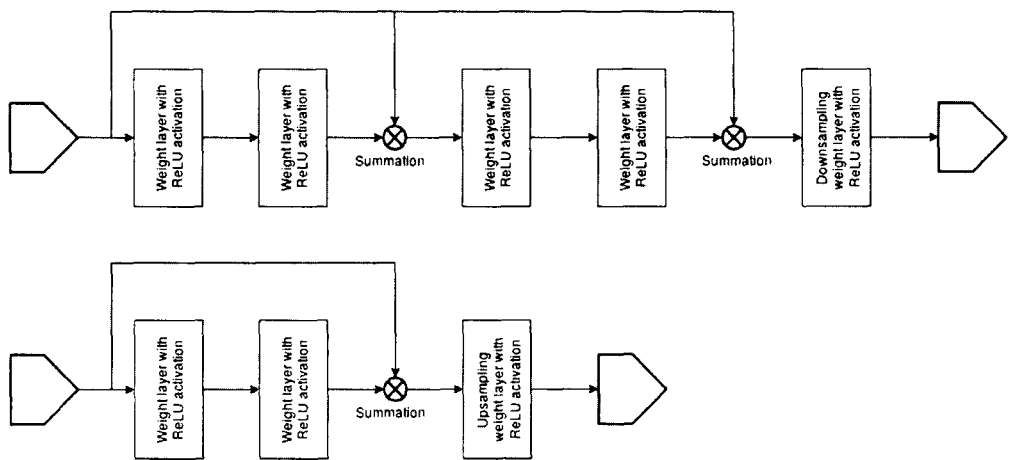
FIG. 3 illustrates (top) preferred downsampling residual block, (bottom) preferred upsampling residual block.

Having assembled T, the preferred training algorithm is described as follows:
1. Each image in R is normalised and cropped to a random area. The crop is then passed to the 'generator'. The preferred generator is an 'encoder-decoder' neural network. The purpose of the generator is to produce a generated (or 'fake') version of V based on a transformation of R:
   a. R propagates through the generator, as shown in FIG. 2. The generator consists of five downsampling residual blocks, as shown in FIG. 3. A 'bottleneck' is then applied, consisting of three convolutional layers. A convolutional layer is a collection of learnt filters that comprise of a n by n set of neurons. The filters convolve over the layer input, producing a feature map. This feature map is essentially a measure of the number of detected learnt features in the input matrix. The initial bottleneck layer downsamples the incoming matrices by a factor of two along the spatial dimensions. A final bottleneck layer deconvolves, or upsamples, the matrices by a factor of two. Five upsampling residual blocks (FIG. 3) are then applied. Each downsampling or upsampling block downsamples or upsamples the spatial image axes by a factor of two while simultaneously increasing or decreasing the number of filters (feature maps) by a factor of two. The preferred method to downsample by a factor of n is to apply a convolutional layer with a pixel stride of n. This increases the spatial distance between convolutional filter samples by a factor of n, reducing the feature map size by a factor of n. Other downsampling methods could also be used. The preferred method to upsample by a factor of n is to apply a transpose convolution (deconvolution) layer with a pixel stride of n. This is equivalent to convolving over an image with a padding of zero valued pixels around each pixel. Other upsampling methods could also be used. Rectified Linear Unit (ReLU) activation is applied after each convolutional layer. A ReLU is a mathematical function that returns the positive part of its argument: $f(x)=\max(0,x)$.
   b. Ideally (but optionally) R can contain channels in addition to the SAR image channels. These additional channels encode other known information. For example, a surface elevation map could be included. Information encoded by a single variable (e.g. days elapsed in the year at the time of observation, or average sun elevation angle) could be included by appending a channel map with all pixels set to the value of the single variable.
   c. Ideally (but optionally), for each region under consideration (in training and in prediction) we construct a corresponding 'rolling prior' image in each of the bands comprising V using archival imaging. Every pixel in each rolling prior image is evaluated as the median value of the last P unobscured (e.g. cloud-free) views of the region subtended by that pixel in each band. We adopt P=15, but this parameter could be varied. The objective is to construct a statistically robust unobscured image that encodes up-to-date knowledge of the surface detail of a given geographic region, observed prior to the current observation (which might be obscured). The rolling prior image is filtered by subtracting a Gaussian-convolved matrix from the original matrix from to produce F. The Gaussian kernel width can be varied appropriately taking into account the spatial resolution of the images comprising V. These filtered images F are summed with the corresponding image in V.
   d. Ideally (but optionally), a residual block, and a convolutional layer with a sigmoid activation (FIG. 2) are applied to blend F and V* and produce the generator output.
2. The generator output(s) V* are concatenated along the channel axis with the corresponding input(s) R to form a new pair (or pairs, in the case of batch sampling) [R,V*]. This is the 'fake' or generated data. This data is passed to the 'discriminator'.
3. The discriminator estimates the probability that V* is an example from the real set of data T. The preferred discriminator architecture is described in FIG. 2 and comprises four layer sets. Each layer set begins with a downsample convolution, followed by two convolution layers. All convolution layers are followed by a ReLU activation. After these layer sets, global average pooling is applied, and the result is densely connected to a binary sigmoid activation output. After propagation of V* through the discriminator, the probability is estimated from a loss function that encodes the quantitative distance between V and V*. The loss function is preferably a combination of a learnt GAN loss, and the Least Absolute Deviations (L1) loss, with the L1 loss weighted at 0.01× the GAN loss.
4. Backpropagation is used to update the network weights so that they follow the steepest descent of the loss (or prediction 'error') between V and V*. After updating the weights, the discriminator can better classify if a given image as being sampled from the real data T or is an output of the generator.
5. The weights of the generator are updated to increase the probability that the generator output is misclassified by the discriminator as originating from the real data T.
6. [R,V] is passed to the discriminator. The discriminator estimates the probability that [R,V] is sampled from the generated set of [R,V*] through the GAN+L1 combination loss function. The loss, or prediction 'error' is backpropagated through the network, and the weights of the discriminator are updated to follow the steepest descent of the loss function.
7. The weights of the discriminator are updated to improve the probability (i.e. reduce the loss) that it correctly classifies [R,V] as being sampled from the real data T and [R,V*] as being a product of the generator.
8. The outputs of the generator can be retrieved at any point during or after training.

After training is complete the network can be stored including on a computer readable medium such as a disk as a transformation matrix encoding all weight information.

This is referred to as the 'model'. The model can now accept a new input R and generate an associated output V* image through step 1. V* represents the prediction for the unseen (e.g. obscured) V that corresponds to R. The outputs are de-normalised to produce images calibrated in an identical manner to the training set. The images can be stored in any format convenient for onward analysis (e.g. GeoTIFF) including any relevant georeferencing metadata.

The images represented by the prediction V* will be functionally equivalent to the V images in T—i.e. the same set of observed bands. Each band is characterised by a bandpass centred at a given wavelength in the visible-infrared spectral range. These output images could be analysed 'as is'. Optionally, using the output images V* it is possible to generate a new set of images V+ at any frequency in the range approximately spanning 400-2300 nm using an analytic interpolation function:

a) Consider a pixel at coordinate (x,y) in each image in V*
b) V* can be considered a set of images V*=[V0, V1, V2, . . . VN]. Each image corresponds to an observed wavelength (or more generally, the response in a given bandpass, encoded by a function r(lambda), where lambda is the wavelength of EM radiation, resulting in an effective or average wavelength for the band). Call the set of wavelengths associated with each image lambda=[lambda0, lambda1, lambda2 . . . lambdaN].
c) Assume a function S(x,y,lambda,p) represents the continuous spectral response of the Earth's surface, where p are a set of parameters. S is described by Equation 1. p represents 6 free parameters. The Gaussian width g and centre c could be variable, but g=20 nm and c=560 nm can be fixed to provide adequate fits to archival data.
d) Find p for each pixel (x,y) by fitting the function S(x,y,lambda,p) to (lambda, V*)—e.g. through least squares minimization.
e) Having determined p(x,y), create a new set of images V+ covering the same region as V* by applying S(x, y,lambda,p) for any given wavelength lambda. Alternatively, convolve the continuous spectrum S with arbitrary bandpass response r(lambda).
f)

$$S(\lambda)=[p_0(1+\exp(-p_1(\lambda-p_2)))^{-1}+p_3]\times\exp(-p_4(\lambda/1500 \text{ nm}))+p_5\exp(-(\lambda-c)^2/2\ g^2) \quad \text{Equation 1}$$

The V+ images can be stored in any format convenient for onward analysis (e.g. GeoTIFF), including any relevant georeferencing metadata.

The algorithm can reliably predict images of the Earth's surface at any frequency/wavelength across the visible to infrared spectral range (wavelengths spanning approximately 400-2300 nm) using SAR imaging.

The level of confidence of the predicted images (e.g. the 68% confidence interval of a given pixel in a given band) can be estimated from the training data through a ground truth/prediction validation exercise.

The performance of the algorithm can be improved by including prior information about the region of interest and observation, for example, surface elevation data, sun angle information, date and time of observation, or previously observed surface detail in the bands of interest.

The algorithm can be used to 'in-fill' regions of visible-infrared band images affected by cloud or cloud shadow (or other obscuration or corruption or missing data), or to generate entire images of a given region if the obscuration is complete (e.g. 100% cloud cover).

The output images can be analysed in the same manner as images directly observed in the visible-infrared bands.

The output images can be used individually (e.g. single-band) or in combination (multi-band) to derive meaningful indicators of surface conditions. These could be related to the presence or absence of water, soil properties, signatures of drought, signatures of overgrazing by cattle, or the presence, density and health of vegetation. Some examples of analysis products derived from the predicted visible-infrared imaging related to agricultural monitoring include, but are not limited to:

Normalized Difference Vegetation Index
Enhanced Vegetation Index
Normalized Difference Water Index
Soil-adjusted Vegetation Index The full spectral response across the visible-infrared bands can be used in many ways to determine surface conditions and properties, and the present Invention allows these techniques to be used. For example, the yield of a particular crop could be estimated by a function of the full visible-infrared spectral response. The spectral response can be mapped to physical parameters (e.g. biomass) through ground truth validation.

Figure 4:
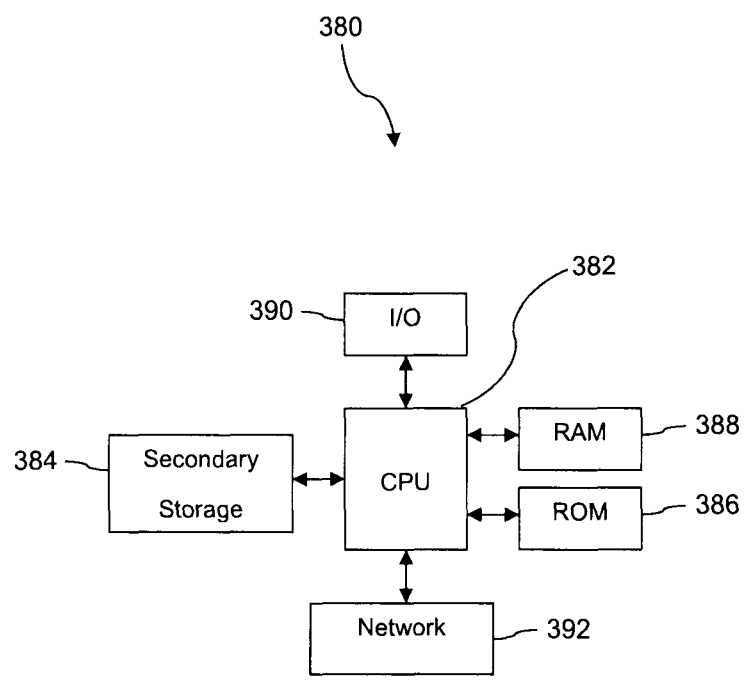
FIG. 4 illustrates a block diagram of a computer system according to an embodiment of the disclosure.

Output images obtained at different times can reveal changes in land use or surface properties, including but not limited to:

Ploughing or cultivation or change of use of a field
Forestation/deforestation
Harvesting of crops
Onset (recovery) of (from) drought
Flooding
Mining activity
Coastal erosion
The growth stage of vegetation/crops
Under or overgrazing by cattle
Construction or destruction of buildings or changes to urban infrastructure The output images could be used to:
Predict the expected yield of a crop or the dry matter content, e.g. measured in kilograms per hectare
Predict the optimal time for harvesting based on the growth stage of a particular crop
Classify land-use (urban, agriculture, forest, etc.)
Identify signatures of crop stress
Classify soil type
Estimate the fraction of a patch of land that is bare (e.g. from overgrazing by cattle)
Estimate surface texture (e.g. different tillage)
Identify signatures of pest infestation or disease in crops and vegetation
Identify anomalies in the spectral response of a region relative to the surrounding area or regions with similar properties (e.g. fields of rapeseed) within an image taken at a single epoch, or between observations taken at different epochs
Identify regions of flooding or at risk from flooding
Measure the surface area of water in rivers, reservoirs, lakes, and other permanent or transient bodies of water
Identify regions affected by or under threat from wildfire
Identify temporal trends and/or statistical anomalies in the spectral response across the visible-infrared bands either on a pixel-by-pixel basis, or averaged/aggregated over multiple pixels (e.g. a field)
Identify natural and artificial boundaries such as hedges around a field
Measure changes to the track of a river
Identify and measure sites of coastal erosion Identify and classify changes in land use, e.g. agricultural-to-urban, or due to industrial or military activity Measure local and macroscopic trends related to normal and anomalous environmental conditions, for example, the emergence of leaves on deciduous trees across a country The algorithm discussed herein may be performed on a computer system. FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392.

While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

In a first embodiment a method of translating an input image R to an output image V* comprises: a) obtaining a mapping model for translating the input image to the output image, wherein the method of obtaining the mapping model comprises: i) obtaining an ensemble of training data T comprising a sample of pairs of matched images [R,V], ii) providing a neural network and training the neural network with the training data T to obtain the mapping model V*=f(R) that translates input image R to output image V* where V* is equivalent to V in a flawless mapping, wherein R comprises at least one image, encoded as a data matrix and wherein R is of size m×n of a patch of the Earth's surface spanning a physical region p×q, wherein V comprises at least one image, encoded as a data matrix and wherein V is of size m×n of a patch of the Earth's surface spanning a physical region p×q, wherein R further comprises additional information representing prior knowledge about the region of interest or the observing conditions of V and/or R wherein the additional information includes but is not limited to one or more of: a map of the surface elevation; a previously observed unobscured view in one or more visible-infrared spectral bands; a map of the location of each pixel; time of year; and sun elevation/azimuth angle information; and b) inputting a new image R into the mapping model; wherein the mapping model translates input image R and outputs image V* wherein the output V* comprises at least one image, encoded as a data matrix and wherein the output V* is of size m×n of a patch of the Earth's surface spanning a physical region p×q.

A second embodiment can include the method of the first embodiment, wherein the training data T comprises a plurality of real matched images [R,V].

A third embodiment can include the method of the first embodiment or the second embodiment, wherein the neural network comprises a generator and a discriminator.

A fourth embodiment can include the method of any of the preceding embodiments, wherein the method of obtaining the mapping model comprises the following steps: 1) propagating R into the generator, wherein the generator produces V* which represents a "fake" version of V based on a transformation of R; 2) associating V* with R to form new matched pair [R,V*]; 3) propagating [R,V*] into the discriminator to determine the probability that V* is "real", wherein the probability that V* is "real" is estimated from a loss function that encodes the quantitative distance between V and V*; 4) backpropagating the error defined by the loss function through the neural network.

A fifth embodiment can include the method of the fourth embodiment, wherein there are N iterations of training steps 1 to 4 wherein T is sampled at each iteration.

A sixth embodiment can include the method of fourth embodiment or the fifth embodiment, wherein the loss function is learnt by the neural network.

A seventh embodiment can include the method of the fourth embodiment or the fifth embodiment, wherein the loss function is hard-coded.

An eighth embodiment can include the method of the fourth embodiment or the fifth embodiment, wherein the loss function is a combination of hard-coding and learning by the neural network.

A ninth embodiment can include the method of the eighth embodiment, wherein the loss function is a combination of a learnt GAN loss, and a Least Absolute Deviations (L1) loss, with the L1 loss weighted at a fraction of the GAN loss.

A tenth embodiment can include the method of any of the preceding embodiments, wherein each image in R and V is normalised.

An eleventh embodiment can include the method of the tenth embodiment, wherein normalisation comprises a rescaling of the input values to floating point values in a fixed range.

A twelfth embodiment can include the method of any of the preceding embodiments, wherein the neural network comprises an encoder-decoder neural network.

A thirteenth embodiment can include the method of any of the preceding embodiments, wherein the neural network comprises a conditional GAN.

A fourteenth embodiment can include the method of any of the preceding embodiments, wherein the neural network comprises a fully convolutional conditional GAN.

A fifteenth embodiment can include the method of the fourth embodiment, wherein the backpropagation of the error defined by the loss function updates the weights in the neural network so that they follow the steepest descent of the loss between V and V*.

A sixteenth embodiment can include the method of any of the preceding embodiments, wherein R comprises at least one SAR image, encoded as a data matrix.

A seventeenth embodiment can include the method of any of the preceding embodiments, wherein V comprises at least one image in the visible-infrared spectral range, encoded as a data matrix.

An eighteenth embodiment can include the method of any of the preceding embodiments, wherein V* comprises at least one image in the visible-infrared spectral range, encoded as a data matrix.

A nineteenth embodiment can include the method of any of the preceding embodiments, wherein the visible-infrared spectral range is between about 400-2300 nanometres (nm).

A twentieth embodiment can include the method of any of the preceding embodiments, wherein V is of size m×n at one or more frequencies across the visible-infrared spectral range.

A twenty-first embodiment can include the method of any of the preceding embodiments, wherein V* is of size m×n at one or more frequencies across the visible-infrared spectral range.

A twenty-second embodiment can include the method of any of the preceding embodiments, wherein where there are a plurality of images R they are all recorded at a single radar frequency.

A twenty-third embodiment can include the method of any of the preceding embodiments, wherein where there are a plurality of images R they are recorded at multiple frequencies.

A twenty-fourth embodiment can include the method of any of the preceding embodiments, wherein where there are a plurality of images R they are all recorded at a single polarisation.

A twenty-fifth embodiment can include the method of any of the first embodiment to the twenty-third embodiment, wherein where there are a plurality of images R they are recorded at multiple polarisations.

A twenty-sixth embodiment can include the method of any of the preceding embodiments, wherein where there are a plurality of images R they are recorded at different detection orientations/incident angles.

A twenty-seventh embodiment can include the method of any of the preceding embodiments, wherein the additional information is selected from one or more of: a map of the surface elevation; a previously recorded unobscured view in one or more visible-infrared spectral bands; a map of the location of each pixel; time of year; and sun elevation/azimuth angle information.

A twenty-eight embodiment can include a method of predicting the visible-infrared band images of a region of the Earth's surface that would be observed by an EO satellite or other high-altitude imaging platform, using data from SAR imaging of the same region using the method of any of the first embodiment to the twenty-seventh embodiment.

A twenty-ninth embodiment can include a method of the twenty-eight embodiment used to predict images of the Earth's surface in the visible-infrared bands when the view between an imaging instrument and the ground is obscured by cloud or some other medium that is opaque to EM radiation in the visible-infrared spectral range, spanning approximately 400-2300 nanometres (nm), but transparent to EM radiation in the radio-/microwave part of the spectrum.

A thirtieth embodiment can include an imaging apparatus for translating an input image R to an output image V* according to any of the first embodiment to the twenty-ninth embodiment.

A thirty-first embodiment can include the method of any of the first embodiment to the twenty-ninth embodiment, further comprising generating a new set of images V+ at any frequency in the range approximately spanning 400-2300 nm from V*.

A thirty-second embodiment can include the method of the thirty-first embodiment, comprising the following steps: a) considering a pixel at coordinate (x,y) in each image in V*, wherein V* can be considered a set of images V*=[V0, V1, V2, . . . VN] wherein each image corresponds to an observed bandpass at some average wavelength of EM radiation and wherein the set of wavelengths associated with each image is lambda=[lambda0, lambda1, lambda2 . . . lambdaN]; b) assuming a function S(x,y,lambda,p) represents the continuous spectral response of the Earth surface, where p are a set of parameters, S is described by Equation 1, and p represents 6 free parameters; c) finding p for each pixel (x,y) by fitting the function S(x,y,lambda,p) to (lambda,V*); and d) creating a new set of images V+ covering the same region as V* by applying S(x,y,lambda,p) for any given wavelength lambda $$S(\lambda)=[p_0(1+\exp(-p_1(\lambda-p_2)))^{-1}+p_3]\times\exp(-p_4(\lambda/1500\ nm))+p_5\exp(-(\lambda-c)^2/2\ g^2) \quad \text{Equation 1.}$$

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein. Aspects of the present invention include but are not limited to:

A method of predicting visible-infrared band images of a region of the Earth's surface that would be observed by an EO satellite or other high-altitude imaging platform, using data from SAR imaging of the same region, the method comprising:
  obtaining a mapping model for translating the input image to the output image, wherein the method of obtaining the mapping model comprises:
    i) obtaining an ensemble of training data T comprising a sample of pairs of matched images [R,V],
    ii) providing a neural network and training the neural network with the training data T to obtain the mapping model V*=f(R) that translates input image R to output image V* where V* is equivalent to V in a flawless mapping,
wherein R comprises at least one SAR image of the region of the Earth's surface, encoded as a data matrix and wherein R is of size m×n of a patch of the Earth's surface spanning a physical region p×q, wherein V comprises at least one image, encoded as a data matrix and wherein V is of size m×n of a patch of the Earth's surface spanning a physical region p×q, wherein R further comprises additional information representing prior knowledge about the region of interest or the observing conditions of V and/or R, and wherein the additional information includes but is not limited to one or more of: a map of the surface elevation; a previously observed unobscured view in one or more visible-infrared spectral bands; a map of the location of each pixel; time of year; and sun elevation/azimuth angle information;
  inputting a new image R into the mapping model;
  translating, by the mapping model, input image R; and
  outputting, by the mapping model, image V*, wherein the output V* comprises at least one visible-infrared band image of the region of the Earth's surface, encoded as a data matrix and wherein the output V* is of size m×n of a patch of the Earth's surface spanning a physical region p×q.

Optionally the mapping model is used to predict the visible-infrared band images of the region of the Earth's surface when the view between an imaging instrument and the ground is obscured by cloud or some other medium that is opaque to EM radiation in the visible-infrared spectral range, spanning approximately 400-2300 nanometres (nm), but transparent to EM radiation in the radio-/microwave part of the spectrum.

Optionally the additional information is selected from one or more of: a map of the surface elevation; a previously recorded unobscured view in one or more visible-infrared spectral bands; a map of the location of each pixel; time of year; and sun elevation/azimuth angle information.

A method of translating an input image R to an output image V*, the method comprising:
  a) obtaining a mapping model for translating the input image to the output image, wherein the method of obtaining the mapping model comprises:
    i) obtaining an ensemble of training data T comprising a sample of pairs of matched images [R,V],
    ii) providing a neural network and training the neural network with the training data T to obtain the mapping model V*=f(R) that translates input image R to output image V* where V* is equivalent to V in a flawless mapping,
wherein R comprises at least one image, encoded as a data matrix and wherein R is of size m×n of a patch of the Earth's surface spanning a physical region p×q, wherein V comprises at least one image, encoded as a data matrix and wherein V is of size m×n of a patch of the Earth's surface spanning a physical region p×q, wherein R further comprises additional information representing prior knowledge about the region of interest or the observing conditions of V and/or R wherein the additional information includes but is not limited to one or more of: a map of the surface elevation; a previously observed unobscured view in one or more visible-infrared spectral bands; a map of the location of each pixel; time of year; and sun elevation/azimuth angle information; and
  b) inputting a new image R into the mapping model;
wherein the mapping model translates input image R and outputs image V* wherein the output V* comprises at least one image, encoded as a data matrix and wherein the output V* is of size m×n of a patch of the Earth's surface spanning a physical region p×q.

Optionally the training data T comprises a plurality of real matched images [R,V].

Optionally the neural network comprises a generator and a discriminator.

Optionally the method of obtaining the mapping model comprises the following steps:
  1) propagating R into the generator, wherein the generator produces V* which represents a "fake" version of V based on a transformation of R
  2) associating V* with R to form new matched pair [R,V*]
  3) propagating [R,V*] into the discriminator to determine the probability that V* is "real", wherein the probability that V* is "real" is estimated from a loss function that encodes the quantitative distance between V and V*
  4) backpropagating the error defined by the loss function through the neural network.

Optionally there are N iterations of training steps 1 to 4 wherein T is sampled at each iteration.

Optionally the loss function is learnt by the neural network.

Optionally the loss function is hard-coded.

Optionally the loss function is a combination of hard-coding and learning by the neural network.

Optionally the loss function is a combination of a learnt GAN loss, and a Least Absolute Deviations (L1) loss, with the L1 loss weighted at a fraction of the GAN loss.

Optionally each image in R and V is normalised.

Optionally normalisation comprises a rescaling of the input values to floating point values in a fixed range.

Optionally the neural network comprises an encoder-decoder neural network.

Optionally the neural network comprises a conditional GAN.

Optionally the neural network comprises a fully convolutional conditional GAN.

Optionally the backpropagation of the error defined by the loss function updates the weights in the neural network so that they follow the steepest descent of the loss between V and V*.

Optionally R comprises at least one SAR image, encoded as a data matrix.

Optionally V comprises at least one image in the visible-infrared spectral range, encoded as a data matrix.

Optionally V* comprises at least one image in the visible-infrared spectral range, encoded as a data matrix.

Optionally the visible-infrared spectral range is between about 400-2300 nanometres (nm).

Optionally V is of size m×n at one or more frequencies across the visible-infrared spectral range.

Optionally V* is of size m×n at one or more frequencies across the visible-infrared spectral range.

Optionally where there are a plurality of images R they are all recorded at a single radar frequency.

Optionally where there are a plurality of images R they are recorded at multiple frequencies.

Optionally where there are a plurality of images R they are all recorded at a single polarisation.

Optionally where there are a plurality of images R they are recorded at multiple polarisations.

Optionally where there are a plurality of images R they are recorded at different detection orientations/incident angles.

Optionally the additional information is selected from one or more of: a map of the surface elevation; a previously recorded unobscured view in one or more visible-infrared spectral bands; a map of the location of each pixel; time of year; and sun elevation/azimuth angle information.

Optionally the method further comprises predicting the visible-infrared band images of a region of the Earth's surface that would be observed by an EO satellite or other high-altitude imaging platform, using data from SAR imaging of the same region, wherein output V* comprises the predicted visible-infrared band images.

Optionally the visible-infrared band images of the Earth's surface are predicted when the view between an imaging instrument and the ground is obscured by cloud or some other medium that is opaque to EM radiation in the visible-infrared spectral range, spanning approximately 400-2300 nanometres (nm), but transparent to EM radiation in the radio-/microwave part of the spectrum.

An imaging apparatus for translating an input image R to an output image V*.

Optionally the method further comprises generating a new set of images V+ at any frequency in the range approximately spanning 400-2300 nm from V*.

Optionally the method comprises the following steps:
a) considering a pixel at coordinate (x,y) in each image in V*, wherein V* can be considered a set of images V*=[V0, V1, V2, . . . VN] wherein each image corresponds to an observed bandpass at some average wavelength of EM radiation and wherein the set of wavelengths associated with each image is lambda= [lambda0, lambda1, lambda2 . . . lambdaN];
b) assuming a function S(x,y,lambda,p) represents the continuous spectral response of the Earth surface, where p are a set of parameters, S is described by Equation 1, and p represents 6 free parameters;
c) finding p for each pixel (x,y) by fitting the function S(x,y,lambda,p) to (lambda,V*); and
d) creating a new set of images V+ covering the same region as V* by applying S(x,y,lambda,p) for any given wavelength lambda $$S(\lambda)=[p_0(1+\exp(-p_1(\lambda-p_2)))^{-1}+p_3]\times\exp(-p_4(\lambda/1500 \text{ nm}))+p_5 \exp(-(\lambda-c)^2/2\ g^2) \quad \text{Equation 1.}$$

The invention claimed is:

1. A method of predicting visible-infrared band images of a region of the Earth's surface that would be observed by an EO satellite or other high-altitude imaging platform, using data from SAR imaging of the same region, the method comprising:
obtaining a mapping model for translating the input image to the output image, wherein the method of obtaining the mapping model comprises:
i) obtaining an ensemble of training data T comprising a sample of pairs of matched images [R,V],
ii) providing a neural network and training the neural network with the training data T to obtain the mapping model V*=f(R) that translates input image R to output image V* where V* is equivalent to V in a flawless mapping,
wherein R comprises at least one SAR image of the region of the Earth's surface, encoded as a data matrix and wherein R is of size m×n of a patch of the Earth's surface spanning a physical region p×q, wherein V comprises at least one image, encoded as a data matrix and wherein V is of size m×n of a patch of the Earth's surface spanning a physical region p×q, wherein R further comprises additional information representing prior knowledge about the region of interest or the observing conditions of V and/or R, and wherein the additional information includes but is not limited to one or more of: a map of the surface elevation; a previously observed unobscured view in one or more visible-infrared spectral bands; a map of the location of each pixel; time of year; and sun elevation/azimuth angle information;
inputting a new image R into the mapping model;
translating, by the mapping model, input image R; and
outputting, by the mapping model, image V*, wherein the output V* comprises at least one visible-infrared band image of the region of the Earth's surface, encoded as a data matrix and wherein the output V* is of size m×n of a patch of the Earth's surface spanning a physical region p×q.

2. The method according to claim 1 wherein the mapping model is used to predict the visible-infrared band images of the region of the Earth's surface when the view between an imaging instrument and the ground is obscured by cloud or some other medium that is opaque to EM radiation in the visible-infrared spectral range, spanning approximately 400-2300 nanometres (nm), but transparent to EM radiation in the radio-/microwave part of the spectrum.

3. The method according to claim 1 wherein the additional information is selected from one or more of: a map of the surface elevation; a previously recorded unobscured view in one or more visible-infrared spectral bands; a map of the location of each pixel; time of year; and sun elevation/azimuth angle information.

4. A method of translating an input image R to an output image V*, the method comprising:
   a) obtaining a mapping model for translating the input image to the output image, wherein the method of obtaining the mapping model comprises:
      i) obtaining an ensemble of training data T comprising a sample of pairs of matched images [R,V],
      ii) providing a neural network and training the neural network with the training data T to obtain the mapping model V*=f(R) that translates input image R to output image V* where V* is equivalent to V in a flawless mapping,
      wherein R comprises at least one image, encoded as a data matrix and wherein R is of size m×n of a patch of the Earth's surface spanning a physical region p×q, wherein V comprises at least one image, encoded as a data matrix and wherein V is of size m×n of a patch of the Earth's surface spanning a physical region p×q, wherein R further comprises additional information representing prior knowledge about the region of interest or the observing conditions of V and/or R wherein the additional information includes but is not limited to one or more of: a map of the surface elevation; a previously observed unobscured view in one or more visible-infrared spectral bands; a map of the location of each pixel; time of year; and sun elevation/azimuth angle information; and
   b) inputting a new image R into the mapping model;
   wherein the mapping model translates input image R and outputs image V* wherein the output V* comprises at least one image, encoded as a data matrix and wherein the output V* is of size m×n of a patch of the Earth's surface spanning a physical region p×q.

5. A method according to claim 4 wherein the neural network comprises a generator and a discriminator.

6. A method according to claim 5 wherein the method of obtaining the mapping model comprises the following steps:
   5) propagating R into the generator, wherein the generator produces V* which represents a "fake" version of V based on a transformation of R
   6) associating V* with R to form new matched pair [R,V*]
   7) propagating [R,V*] into the discriminator to determine the probability that V* is "real", wherein the probability that V* is "real" is estimated from a loss function that encodes the quantitative distance between V and V*
   8) backpropagating the error defined by the loss function through the neural network.

7. A method according to claim 6 wherein there are N iterations of training steps 1 to 4 wherein T is sampled at each iteration.

8. A method according to claim 6 wherein the loss function is learnt by the neural network, or
   wherein the loss function is hard-coded, or
   wherein the loss function is a combination of hard-coding and learning by the neural network.

9. A method according to claim 8 wherein the loss function is a combination of a learnt GAN loss, and a Least Absolute Deviations (L1) loss, with the L1 loss weighted at a fraction of the GAN loss.

10. A method according to claim 4 wherein the neural network comprises an encoder-decoder neural network.

11. A method according to claim 4 wherein the neural network comprises a conditional GAN.

12. A method according to claim 4 wherein the neural network comprises a fully convolutional conditional GAN.

13. A method according to claim 6 wherein the backpropagation of the error defined by the loss function updates the weights in the neural network so that they follow the steepest descent of the loss between V and V*.

14. A method according to claim 4 wherein R comprises at least one SAR image, encoded as a data matrix,
   wherein V comprises at least one image in the visible-infrared spectral range, encoded as a data matrix, and
   wherein V* comprises at least one image in the visible-infrared spectral range, encoded as a data matrix.

15. A method according to claim 14 wherein V is of size m×n at one or more frequencies across the visible-infrared spectral range, and
   wherein V* is of size m×n at one or more frequencies across the visible-infrared spectral range.

16. A method according to claim 4 wherein where there are a plurality of images R they are all recorded at a single radar frequency.

17. A method according to claim 4 wherein where there are a plurality of images R they are recorded at multiple frequencies.

18. A method according to claim 4 wherein where there are a plurality of images R they are all recorded at a single polarisation.

19. A method according to claim 4 wherein where there are a plurality of images R they are recorded at multiple polarisations.

20. A method according to claim 4 wherein where there are a plurality of images R they are recorded at different detection orientations/incident angles.

21. A method according to claim 4 wherein the additional information is selected from one or more of: a map of the surface elevation; a previously recorded unobscured view in one or more visible-infrared spectral bands; a map of the location of each pixel; time of year; and sun elevation/azimuth angle information.

22. A method according to claim 4 further comprising predicting the visible-infrared band images of a region of the Earth's surface that would be observed by an EO satellite or other high-altitude imaging platform, using data from SAR imaging of the same region, wherein output V* comprises the predicted visible-infrared band images.

23. A method according to claim 22 wherein the visible-infrared band images of the Earth's surface are predicted when the view between an imaging instrument and the ground is obscured by cloud or some other medium that is opaque to EM radiation in the visible-infrared spectral range, spanning approximately 400-2300 nanometres (nm), but transparent to EM radiation in the radio-/microwave part of the spectrum.

24. An imaging apparatus for translating an input image R to an output image V* according to claim 4.

25. A method according to claim 4 further comprising generating a new set of images V+ at any frequency in the range approximately spanning 400-2300 nm from V*.

26. A method as claimed in claim 25 comprising the following steps:
   e) considering a pixel at coordinate (x,y) in each image in V*, wherein V* can be considered a set of images V*=[V0, V1, V2, . . . VN] wherein each image corresponds to an observed bandpass at some average wavelength of EM radiation and wherein the set of wavelengths associated with each image is lambda= [lambda0, lambda1, lambda2 . . . lambdaN];

f) assuming a function S(x,y,lambda,p) represents the continuous spectral response of the Earth surface, where p are a set of parameters, S is described by Equation 1, and p represents 6 free parameters;

g) finding p for each pixel (x,y) by fitting the function S(x,y,lambda,p) to (lambda,V*); and h) creating a new set of images V+ covering the same region as V* by applying S(x,y,lambda,p) for any given wavelength lambda $$S(\lambda)=[p_0(1+\exp(-p_1(\lambda-p_2)))^{-1}+p_3]\times\exp(-p_4(\lambda/1500 \text{ nm}))+p_5\exp(-(\lambda-c)^2/2\text{ g}^2) \quad \text{Equation 1.}$$

\* \* \* \* \*